United States Patent
Walster et al.

(10) Patent No.: US 7,099,851 B2
(45) Date of Patent: Aug. 29, 2006

(54) APPLYING TERM CONSISTENCY TO AN EQUALITY CONSTRAINED INTERVAL GLOBAL OPTIMIZATION PROBLEM

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 658 days.

(21) Appl. No.: 10/017,573

(22) Filed: Dec. 13, 2001

(65) Prior Publication Data

US 2003/0115229 A1    Jun. 19, 2003

(51) Int. Cl.
*G06G 7/122* (2006.01)

(52) U.S. Cl. .............. 706/19; 706/12; 706/14; 706/46; 708/446; 708/493; 708/495; 708/496; 712/222

(58) Field of Classification Search ............... 706/12, 706/14, 19, 46; 712/222; 708/493, 495, 708/496, 550, 446
See application file for complete search history.

(56) References Cited

U.S. PATENT DOCUMENTS

| | | | | |
|---|---|---|---|---|
| 3,900,723 A | * | 8/1975 | Bethany et al. | 708/520 |
| 4,622,650 A | * | 11/1986 | Kulisch | 708/603 |
| 5,253,327 A | * | 10/1993 | Yoshihara | 706/19 |
| 6,049,865 A | * | 4/2000 | Smith | 712/222 |
| 6,718,289 B1 | * | 4/2004 | Suzuki et al. | 703/2 |
| 2002/0184283 A1 | * | 12/2002 | Steele, Jr. | 708/495 |

OTHER PUBLICATIONS

Schulte, M.J.; Swartzlander E.E., Jr., "A variable-precision interval arithmetic processor" Application Specific Array Processors 1994. Proceedings., International Conference on Aug. 22-24, 1994 pp. 248-258.*

M. J. Schulte, K. C. Bickerstaff, and E. E. Swartzlander, Jr., "Hardware Interval Multipliers," Journal of Theoretical and Applied Informatics, vol. 3, No. 2, pp. 73-90, 1996.*

C. Bliek et al., "COCONUT Deliverable D1 Algorithms for Solving Nonlinear Constrained and Optimization Problems: The State of The Art", published on http://www.mat.univie.ac.at/~neum/ms/StArt.pdf, Nov. 2001.*

(Continued)

*Primary Examiner*—Anthony Knight
*Assistant Examiner*—Sergey Datskovskiy
(74) *Attorney, Agent, or Firm*—Park, Vaughan & Fleming LLP

(57) ABSTRACT

One embodiment of the present invention provides a system that solves a global optimization problem specified by a function $f$ and a set of equality constraints $q_i(x)=0$ ($i=1, \ldots, r$), wherein $f$ is a scalar function of a vector $x=(x_1, x_2, x_3, \ldots x_n)$. During operation, the system receives a representation of the function $f$ and the set of equality constraints and stores the representation in a memory within a computer system. Next, the system and performs an interval global optimization process to compute guaranteed bounds on a globally minimum value of the function $f(x)$ subject to the set of equality constraints. Performing this interval global optimization process involves, applying term consistency to the set of equality constraints over a subbox X, and excluding portions of the subbox X that violate the set of equality constraints.

7 Claims, 9 Drawing Sheets

OTHER PUBLICATIONS

Pascal Van Hentenryck, Laurent Michel, "Newton: Constraint Programming over Nonlinear Real Constraints", Science of Programming, 1997.*

F. Benhamou, F. Gouland, L. Granvilliers, "Revising hull and box consistency", In Proceedings of International Conference on Logic Programming, Las Cruses, USA, 1999.*

H. Collavizza, F. Delobel, and M. Rueher. "Comparing Partial Consistencies". Reliable Computing, 5(3):213-228, 1999.*

Pascal Van Hentenryck, Vijay Saraswat and Yves Deville, "Design, Implementation, and Evaluation of the Constraint Language cc (FD)," Elsevier Science, Inc., 1998.

E.R. Hansen, "Global Optimization Using Interval Analysis," Marcel Dekker, Inc., New York, NY, 1992.

R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63-78 http://interval.louisiana.edu/preprints.html.

R. B. Kearfott, Algorithm 763: Interval Arithmetic: A Fortran 90 Module for an Interval Data Type, ACM Trans. Math. Software, 22, vol. 4, 1996, pp. 385-392. http://interval.louisiana.edu/preprints.html.

R. B. Kearfott and M. Novoa III, "Algorithm 681: INTBIS, A portable interval Newton/bisection package", ACM Trans. Math Software, vol. 16, No. 2, pp. 152-147. http://www.netlib.org/toms/681.

R. B. Kearfott, M. Dawande, K.S. Du, and C. Hu, "Algorithm 737: INTLIB: A Portable Fortran 737 Interval Standard Function Library," ACM Trans. Math. Sofware, 20, vol. 4, Dec. 1994, pp. 447-458.

R. B. Kearfott and G. W. Walster, "On Stopping Criteria in Verified Nonlinear Systems or Optimization Algorithms," ACM Trans. Math. Software, 26, vol. 3, Sep. 2000, pp. 323-351. The Publication itself says Received: Jul. 1999; revised: Mar. 2000; accepted: Mar. 2000. http://interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051-1065.

A. Neumaier, "The Enclosure of Solutions of Parameter-Dependent Systems of Euqations," Cambridge University Press, Cambridge, 1990, ISBN: 0-12-505630-3, Reliability in Computing pp. 269-286.

S.M. Rump, "Verification Methods for Dense and Sparse Systems of Equations," in Topics in Validated Computations: Proceedings of the IMACS-GAMM International Workshop on Validated Computations, University of Oldenburg, J. Herzberger, ed., Elsevier Studies in Computational Mathematics, Elsevier, 1994, pp. 63-136.

* cited by examiner $X \equiv [\underline{x}, \bar{x}] \equiv \{x \in \Re^* | \underline{x} \leq x \leq \bar{x}\}$ $Y \equiv [\underline{y}, \bar{y}] \equiv \{y \in \Re^* | \underline{y} \leq y \leq \bar{y}\}$ (1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})], \quad 0 \notin Y$ $X/Y \subseteq \Re^*, \quad 0 \in Y$

FIG. 5

APPLYING TERM CONSISTENCY TO AN EQUALITY CONSTRAINED INTERVAL GLOBAL OPTIMIZATION PROBLEM

RELATED APPLICATION

The subject matter of this application is related to the subject matter in a co-pending non-provisional application by the same inventors as the instant application and filed on the same day as the instant application entitled, "Applying Term Consistency to an Inequality Constrained Interval Global Optimization Problem," having Ser. No. 10/017,574 and filing date Dec. 12, 2001.

BACKGROUND

1. Field of the Invention

The present invention relates to performing arithmetic operations on interval operands within a computer system. More specifically, the present invention relates to a method and an apparatus for using a computer system to solve a global optimization problem including equality constraints with interval arithmetic and term consistency.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

One commonly performed computational operation is to perform equality constrained global optimization to find a global minimum of a nonlinear objective function subject to nonlinear equality constraints of the form $q_i(x)=0$ (i=1, . . . , r). This can be accomplished by deleting boxes, or parts of boxes that do not satisfy one or more equality constraints, or by unconditionally deleting boxes that cannot contain the global minimum $f^*$.

To delete part or all of a subbox that fails to satisfy one or more equality constraints, term consistency and the interval Newton method can be used in combination.

To unconditionally delete part or all of a box that cannot contain the equality constrained global minimum, the smallest upper bound $f\_bar$ so far computed on the global minimum $f^*$ can be used.

In the presence of equality constraints, it can be difficult to identify a feasible point x that is guaranteed to satisfy all the given equality constraints. However, it is relatively easy to prove that a box X contains a feasible point. Given such a box, $\sup(f(X))$ provides a value of $f\_bar$. As this process progresses, $f\_bar$ is updated using $f\_bar=\min(f\_bar, \sup(f(X)))$, given that the box X has been proved to contain a feasible point.

Given an $f\_bar$ value, the $f\_bar$ criterion is applied as an inequality constraint to delete parts or all of a given subbox.

If $f\_bar$ is the smallest upper bound so far computed on $f$, then any point x for which $f(x)>f\_bar$ can be deleted. Similarly, any box X can be deleted if $\inf(f(X))>f\_bar$.

In addition to solving for boxes with feasible points and the $f\_bar$ criterion, the John conditions can be solved to delete parts or all of subboxes and to prove that a given subbox contains a feasible point. (The John conditions are described in "Global Optimization Using Interval Analysis" by Eldon R. Hansen, Marcel Dekker, Inc., 1992.)

Solving the John conditions, works best "in the small" when the objective function $f$ is approximately quadratic and satisfied constraints are approximately linear. For large boxes containing multiple stationary points, solving the John conditions will often not succeed in deleting much of a given box. In this case the box is split into two or more sub-boxes that are then processed independently. By this mechanism all the equality constrained global minima of a nonlinear objective function can be found.

One problem is applying this procedure to large n-dimensional interval vectors (or boxes) that contain multiple local minima. In this case, the process of splitting in n-dimensions can lead to exponential growth in the number of boxes to process.

It is well known that this problem (and even the problem of computing "sharp" bounds on the range of a function of n-variables over an n-dimensional box) is an "NP-hard" problem. In general, NP-hard problems require an exponentially increasing amount of work to solve as n, the number of independent variables, increases.

Because NP-hardness is a worst-case property and because many practical engineering and scientific problems have relatively simple structure, one problem is to use this simple structure of real problems to improve the efficiency of interval equality constrained global optimization algorithms.

Hence, what is needed is a method and an apparatus for using the structure of a nonlinear objective function to improve the efficiency of interval equality constrained global optimization software. To this end, what is needed is a method and apparatus that efficiently deletes "large" boxes or parts of large boxes that using the interval Newton method to solve the John conditions can only split.

SUMMARY

One embodiment of the present invention provides a system that solves a global optimization problem specified by a function $f$ and a set of equality constraints $q_i(x)=0$ ($i=1, \ldots, r$), wherein $f$ is a scalar function of a vector $x=(x_1, x_2, x_3, \ldots x_n)$. During operation, the system receives a representation of the function $f$ and the set of equality constraints and stores the representation in a memory within a computer system Next, the system applies term consistency to the set of equality constraints over a subbox X, and excludes portions of the subbox X that violate the set of equality constraints.

In a variation on the above embodiment, performing the interval global optimization process involves analytically preconditioning the set of equality constraints through multiplication by an approximate inverse matrix B to produce a set of preconditioned equality constraints. It also involves applying term consistency to the set of preconditioned equality constraints over the subbox X, and excluding portions of the subbox X that violate any member of the set of preconditioned equality constraint.

In a variation on the above embodiment, performing the interval global optimization process involves keeping track of a least upper bound $f\_bar$ of the function $f(x)$, and removing from consideration subboxes for which $f(x) > f\_bar$. One way to do so involves applying term consistency to the inequality $f(x) \leq f\_bar$ over the subbox X.

For any function of n-variables $f(x)$ there are different ways to analytically solve for a component $x_j$ of the vector x. For example, one can write $f(x)=g(x_j)-h(x)$, where $g(x_j)$ is a term in $f$ for which it is possible to solve $g(x_j)=y$ for any $x_j$ using $g^{-1}(y)$. For each of these rearrangements, if a given interval box X is used as an argument of h, then the new interval $X_j^+$ for the j-th component of X, is guaranteed to be at least as narrow as the original, $X_j$.

$$X_j^+ = X_j \cap X'_j \text{ where } X'_j = g^{-1}(h(X)).$$

This process is then iterated using different terms g of the function $f$. After reducing any element $X_j$ of the box X to $X_j^+$, the reduced value can be used in X thereafter to speed up the reduction process using other component functions and terms thereof if $f$ is a component of the vector function f.

Hereafter, the notation $g(x_j)$ for a term of the function $f(x)$ implicitly represents any term of any component function. This eliminates the need for additional subscripts that do not add clarity to the exposition.

In a variation on the above embodiment, applying term consistency involves symbolically manipulating an equation within the computer system to solve for a first term, $g(x_j)$, thereby producing a modified equation $g(x_j)=h(x)$, wherein the first term $g(x_j)$ can be analytically inverted to produce an inverse function $g^{-1}(y)$. Next, the system substitutes the subbox X into the modified equation to produce the equation $g(X'_j)=h(X)$, and solving for $X'_j=g^{-1}(h(X))$. Finally, the system intersects $X'_j$ with the interval $X_j$ to produce a new subbox $X^+$, wherein the new subbox $X^+$ contains all solutions of the equation within the subbox X, and wherein the size of the new subbox $X^+$ is less than or equal to the size of the subbox X.

In a variation on the above embodiment, performing the interval global optimization process involves applying box consistency to the set of equality constraints $q_i(x)=0$ ($i=1, \ldots, r$) over the subbox X, and excluding portions of the subbox X that violate any member of the set of equality constraints.

In a variation on the above embodiment, performing the interval global optimization process involves evaluating a first termination condition. This first termination condition is TRUE if a function of the width of the subbox X is less than a pre-specified value, $\epsilon_X$, and the absolute value of the function, $f$, over the subbox X is less than a pre-specified value, $\epsilon_F$. If the first termination condition is TRUE, the system terminates further splitting of the subbox X.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
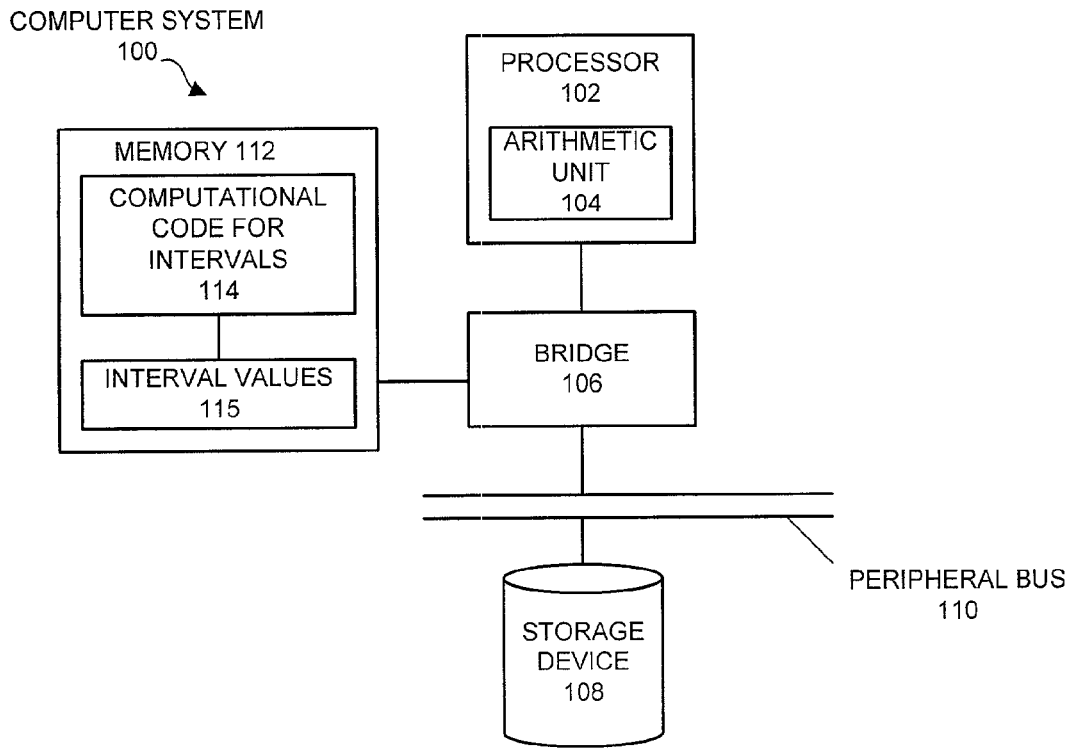
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5. Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
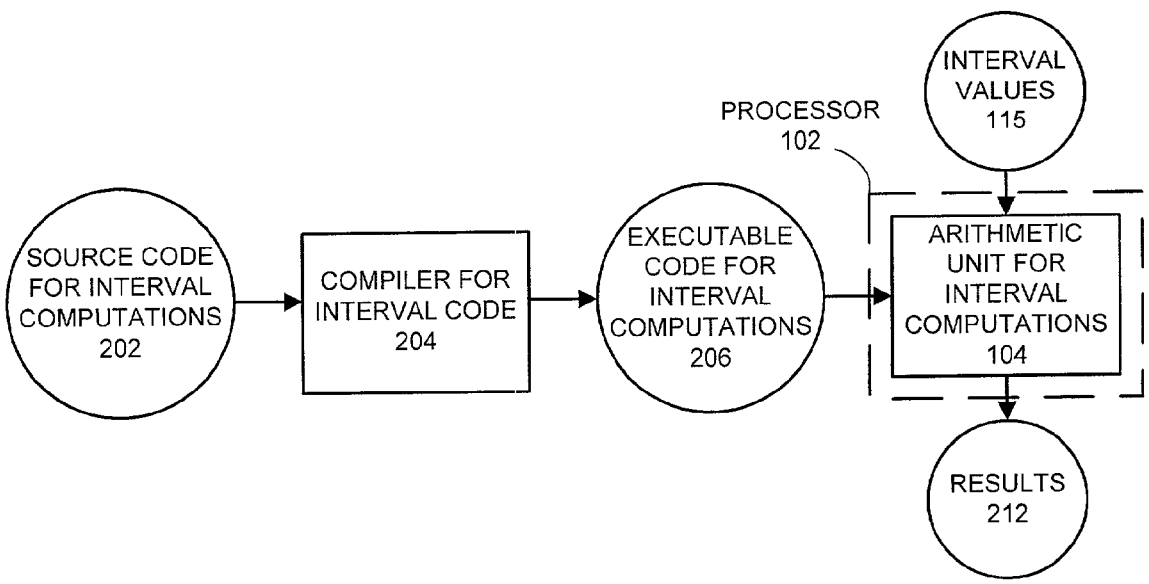
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
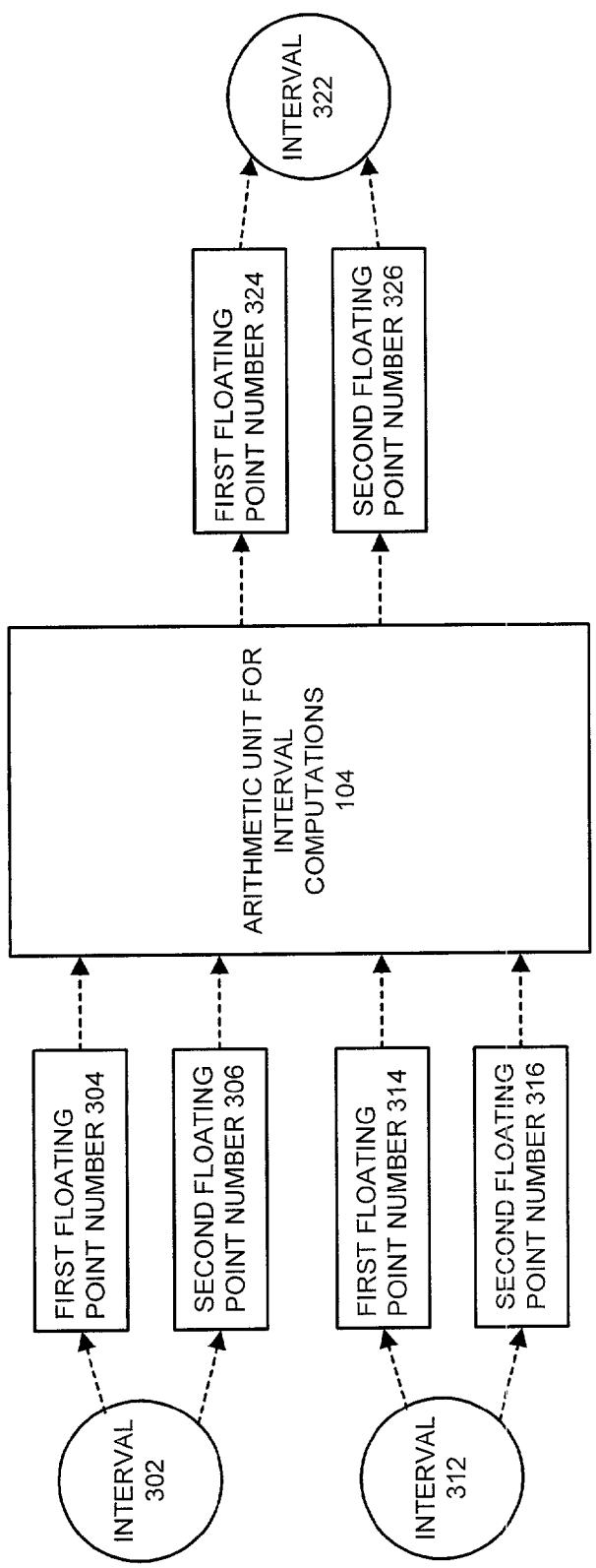
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
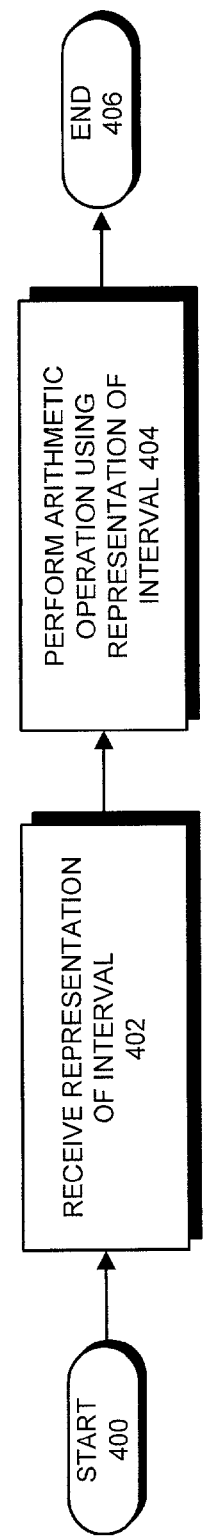
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x,x]. Also note that the left endpoint of an interior interval is always less than or equal to the right endpoint.

The set of extended real numbers, R* is the set of real numbers, R, extended with the two ideal points negative infinity and positive infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Term Consistency

Figure 6:
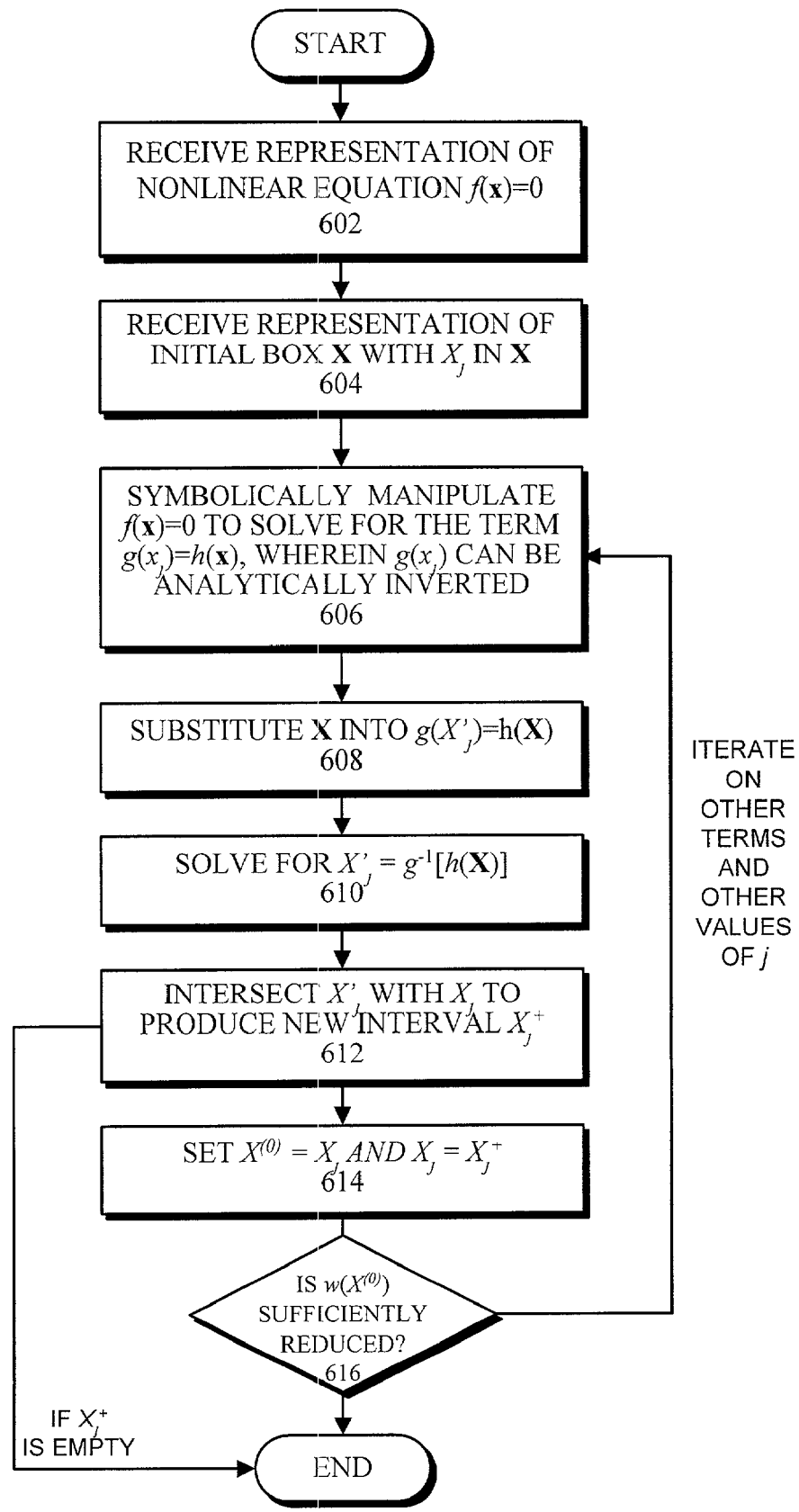
FIG. 6 is a flow chart illustrating the process of finding an interval solution to a nonlinear equation using term consistency in accordance with an embodiment of the present invention.
Figure 7A:
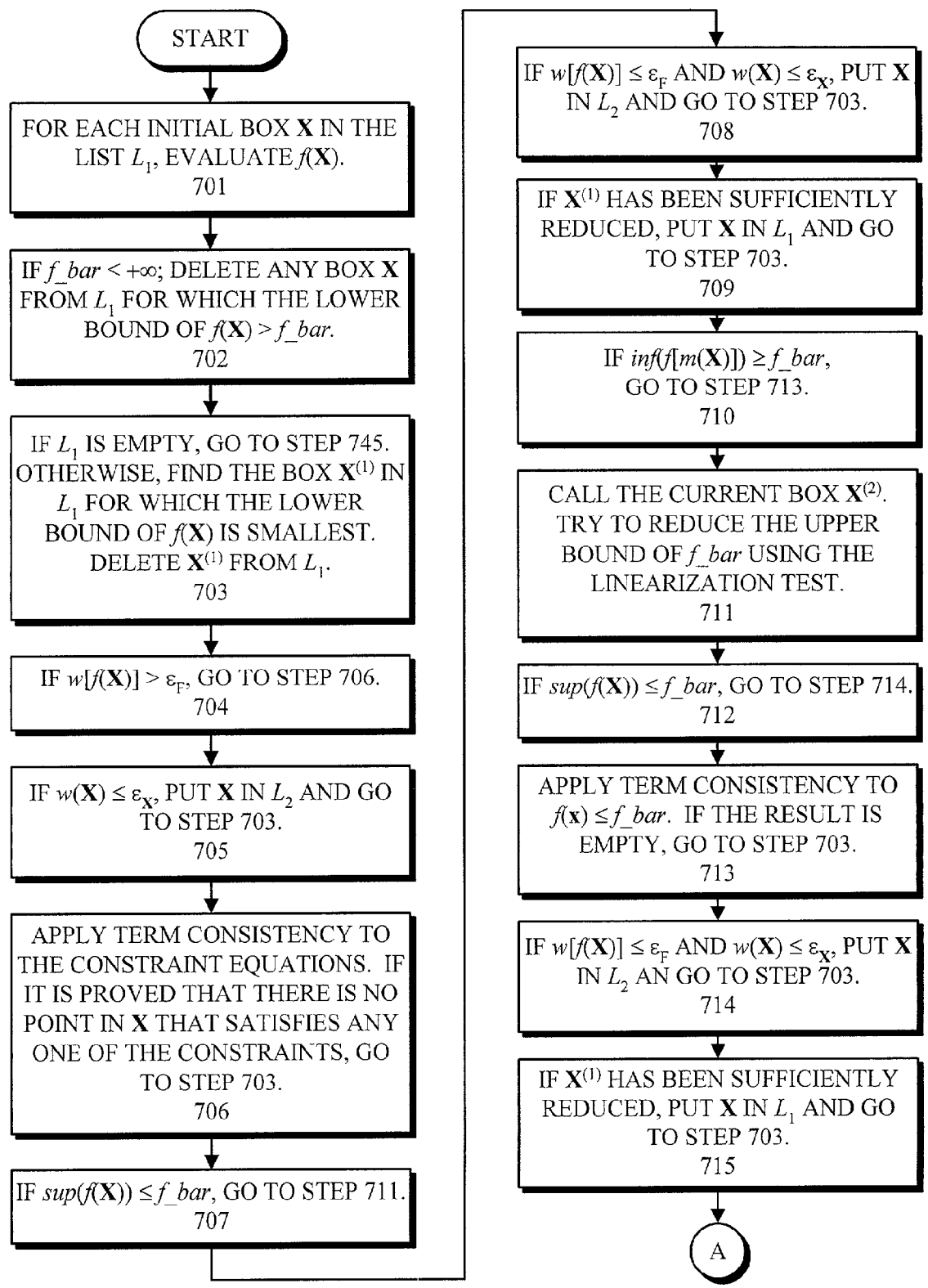
FIG. 7A presents a first portion of a flow chart illustrating the process of using term consistency to solve an interval global optimization problem with equality constraints in accordance with an embodiment of the present invention.
Figure 7B:
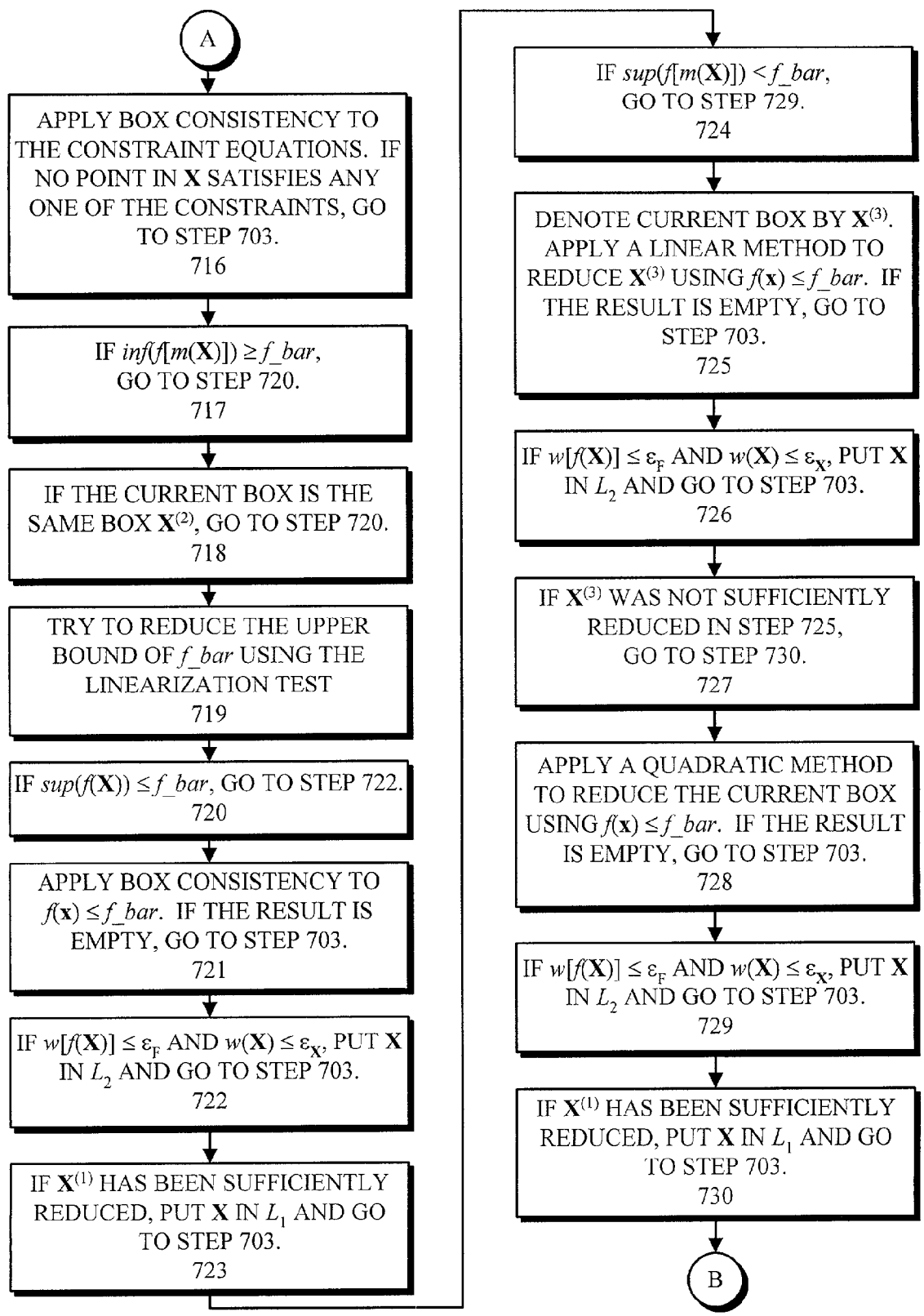
FIG. 7B presents a second portion of a flow chart illustrating the process of using term consistency to solve an interval global optimization problem with equality constraints in accordance with an embodiment of the present invention.
Figure 7C:
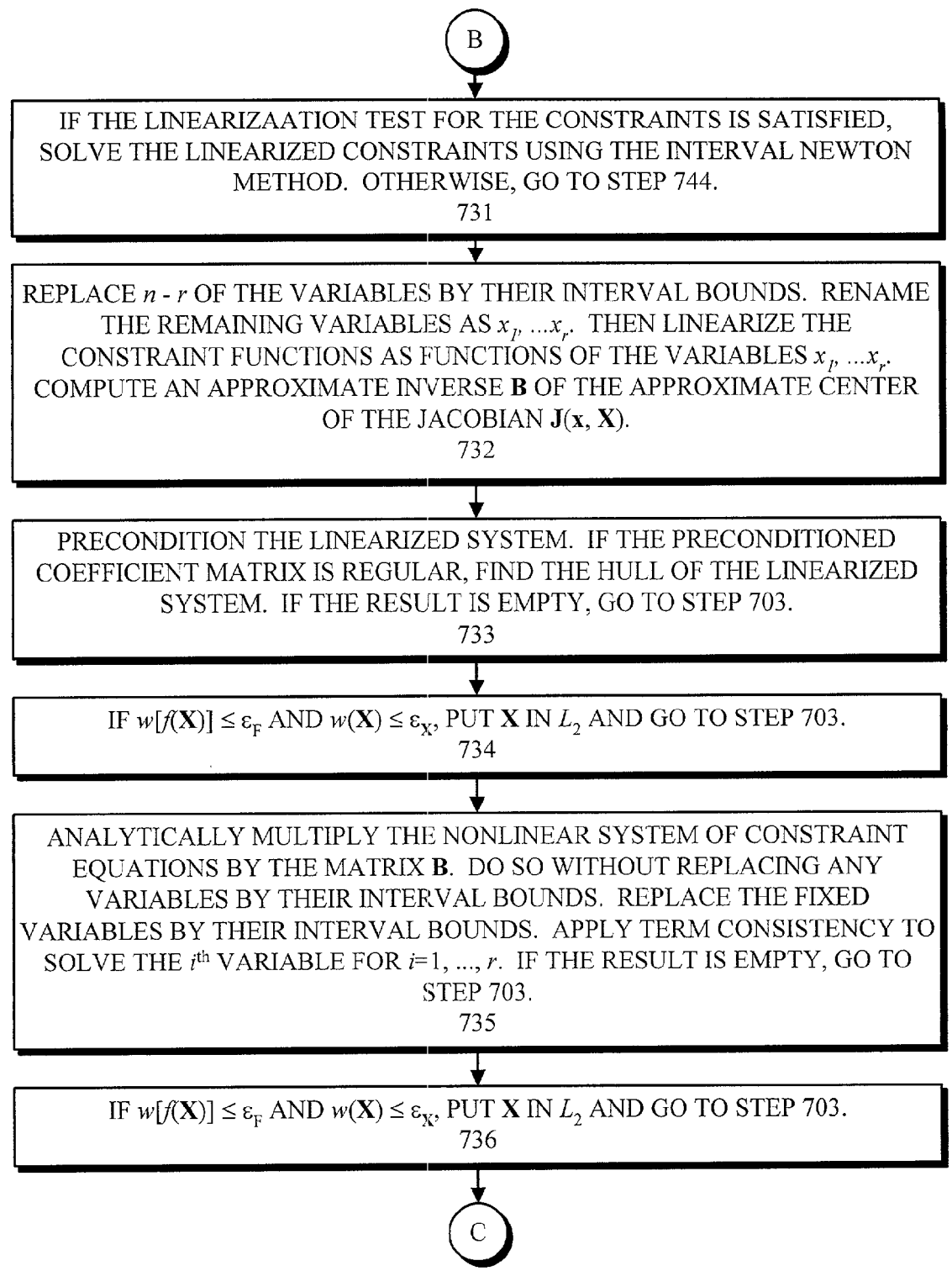
FIG. 7C presents a third portion of a flow chart illustrating the process of using term consistency to solve an interval global optimization problem with equality constraints in accordance with an embodiment of the present invention.
Figure 7D:
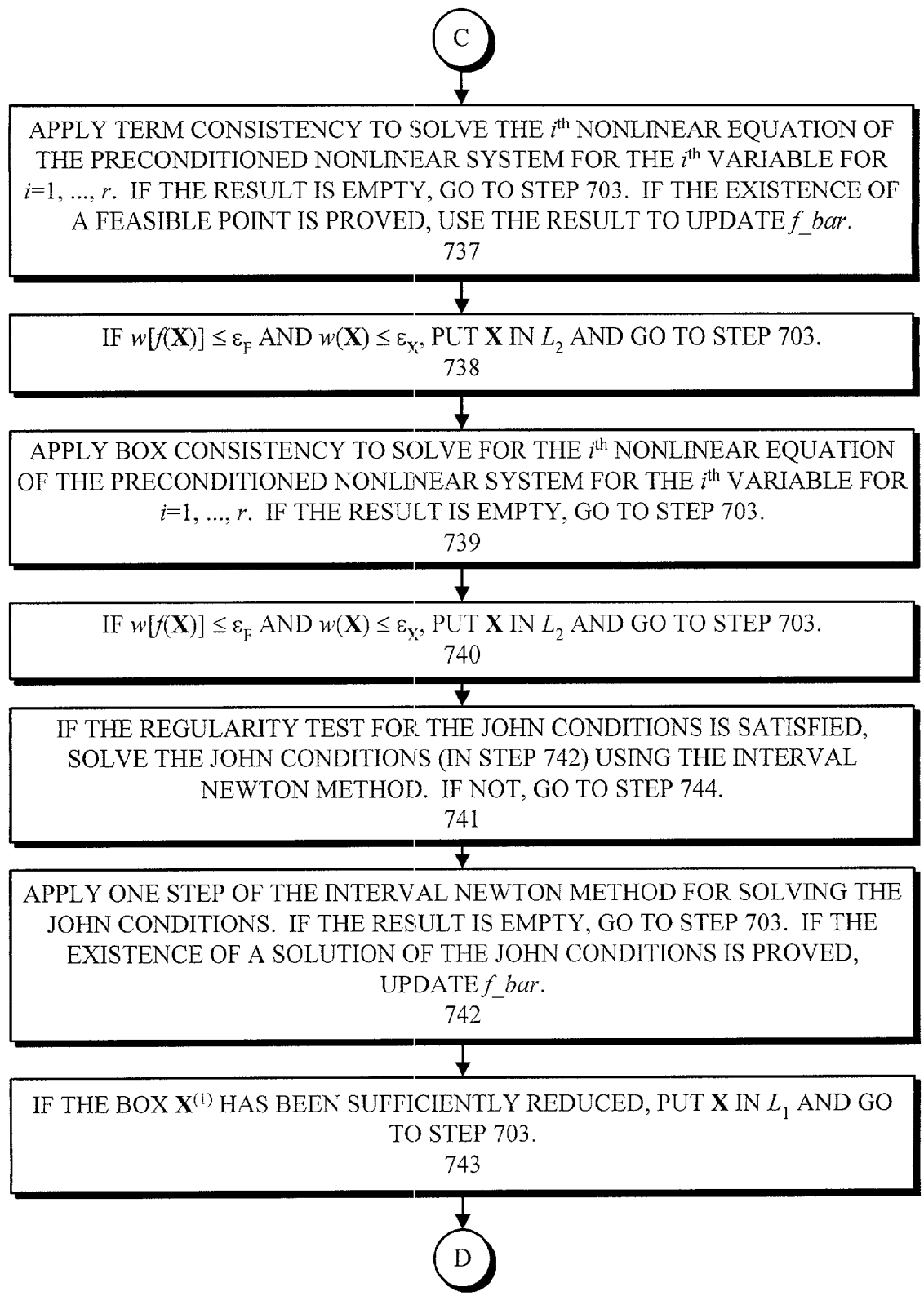
FIG. 7D presents a fourth portion of a flow chart illustrating the process of using term consistency to solve an interval global optimization problem with equality constraints in accordance with an embodiment of the present invention.
Figure 7E:
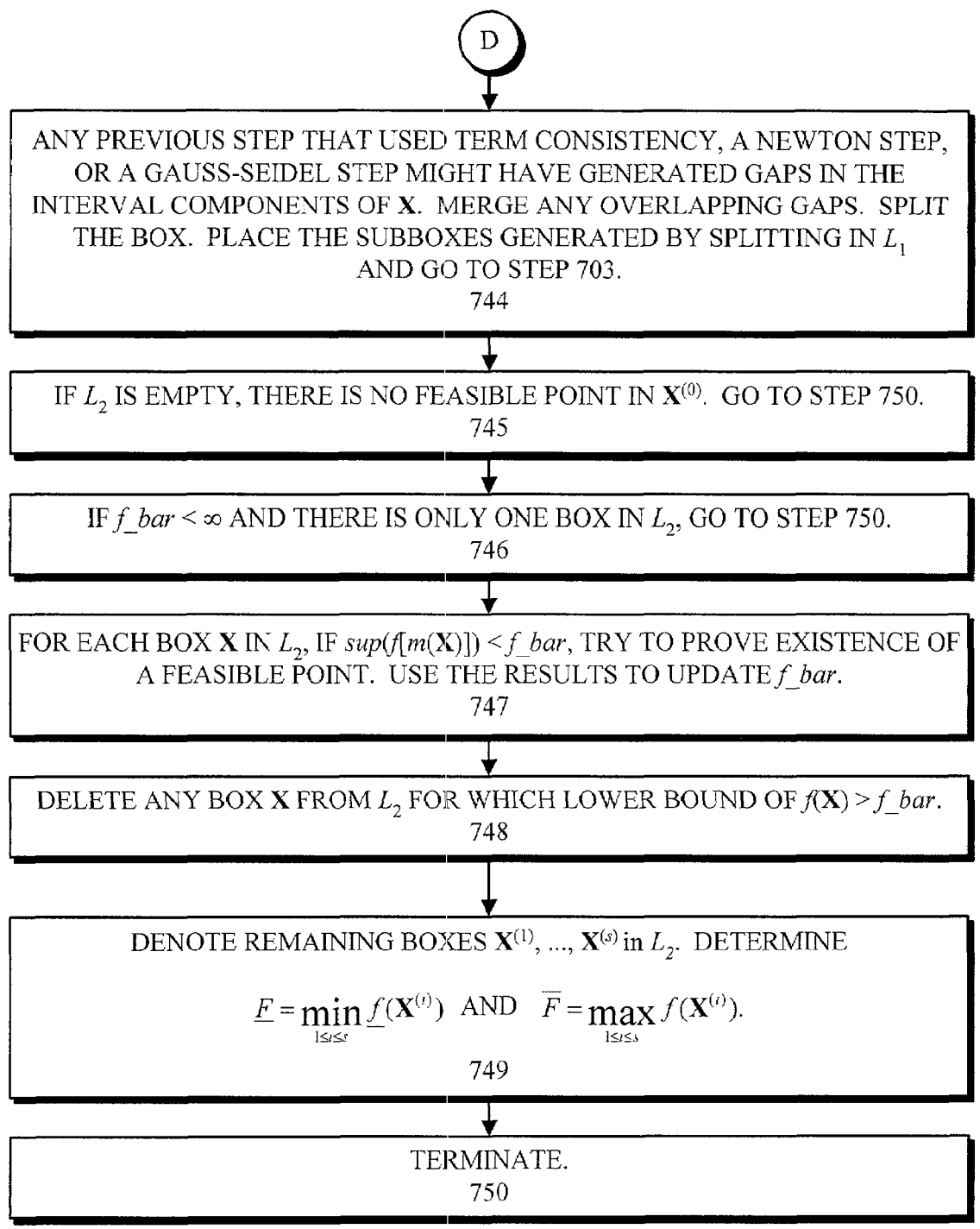
FIG. 7E presents a fifth portion of a flow chart illustrating the process of using term consistency to solve an interval global optimization problem with equality constraints in accordance with an embodiment of the present invention.

FIG. 6 is a flow chart illustrating the process of solving a nonlinear equation through interval arithmetic and term consistency in accordance with an embodiment of the present invention. The system starts by receiving a representation of a nonlinear equation $f(x)=0$ (step 602), as well as a representation of an initial box with X with $X_j$ in X (step 604). Next, the system symbolically manipulates the equation $f(x)=0$ into a form $g(x_j)-h(x)=0$, wherein the term $g(x_j)$ can be analytically inverted to produce an inverse function $g^{-1}(y)$ (step 606).

Next, the system substitutes the initial box X into h(X) to produce the equation $g(X'_j)=h(X)$ (step 608). The system then solves for $X'_j = g^{-1}(h(X))$ (step 610). The resulting interval $X'_j$ is then intersected with the initial interval $X_j$ to produce a new interval $X_j^+$ (step 612).

At this point, if $X_j^+$ is empty, the system can terminate. Otherwise, the system can perform further processing. This further processing involves setting temporarily saving $X_j$ by setting $X^{(0)} = X_j$ and also, setting $X_j = X_j^+$ (step 614). Next, if $w(X^{(0)})$ is sufficiently reduced at step 616, the system returns to step 606 for another iteration of term consistency on another term g of $f(x)$. Otherwise, the system terminates.

Examples of Applying Term Consistency

For example, suppose $f(x)=x^2-x+6$. We can define $g(x)=x^2$ and $h(x)=x-6$. Let $X=[-10,10]$. The procedural step is $(X')^2=X-6=[-16,4]$. Since $(X')^2$ must be non-negative, we replace this interval by $[0,4]$. Solving for X', we obtain $X'=\pm[0,2]$. In replacing the range of h(x) (i.e., [−16,4]) by non-negative values, we have excluded that part of the range h(x) that is not in the domain of $g(x)=x^2$.

Suppose that we reverse the roles of g and h and use the iterative step $h(X')=g(X)$. That is $X'-6=X^2$. We obtain $X'=[6,106]$. Intersecting this result with the interval [−10,10], of interest, we obtain [6,10]. This interval excludes the set of values for which the range of g(X) is not in the intersection of the domain of h(X) with X.

Combining these results, we conclude that any solution of $f(X)=g(X)-h(X)=0$ that occurs in $X=[-10,10]$ must be in both [−2,2] and [6,10]. Since these intervals are disjoint, there can be no solution in [−10,10].

In practice, if we already reduced the interval from [−10,10] to [−2,2] by solving for g, we use the narrower interval as input when solving for h.

This example illustrates the fact that it can be advantageous to solve a given equation for more than one of its terms. The order in which terms are chosen affects the efficiency. Unfortunately, it is not known how best to choose the best order.

Also note that there can be many choices for g(x). For example, suppose we use term consistency to narrow the interval bound X on a solution of $f(x)=ax^4+bx+c=0$. We can let $g(x)=bx$ and compute $X'=-(aX^4+c)/b$ or we can let $g(x)=ax^4$ and compute $X'=\pm[-(bX+c)/a]^{1/4}$. We can also separate $x^4$ into $x^2 * x^2$ and solve for one of the factors $X'=\pm[-(bX+c)/(a,X^2)]^{1/2}$.

In the multidimensional case, we may solve for a term involving more than one variable. We then have a two-stage process. For example, suppose we solve for the term $1/(x+y)$ from the function $f(xy)=1/(x+y)-h(x,y)=0$. Let $x \in X=[1,2]$ and $y \in Y=[0.5,2]$. Suppose we find that $h(X,Y)=[0.5,1]$. Then $1/(x+y) \in [0.5,1]$ so $x+y \in [1,2]$. Now we replace y by $Y=[0.5,2]$ and obtain the bound [−1,1.5] on X. Intersecting this interval with the given bound $X=[1,2]$ on x, we obtain the new bound $X'=[1,1.5]$.

We can use X' to get a new bound on h; but his may require extensive computing if h is a complicated function; so suppose we do not. Suppose that we do, however, use this bound on oui intermediate result $x+y=[1,2]$. Solving for y as [1,2]−X', we obtain the bound [−0.5,1]. Intersecting this interval with Y, we obtain the new bound $Y'=[0.5,1]$ on y. Thus, we improve the bounds on both x and y by solving for a single term of $f$.

The point of these examples is to show that term consistency can be used in many ways both alone and in combination with the interval Newton algorithm to improve the efficiency with which roots of a single nonlinear equation can be computed. The same is true for systems of nonlinear equations.

Term Consistency and Equality Constrained Interval Global Optimization

FIGS. 7A–7E collectively present a flow chart illustrating the process of using term consistency in solving an interval global optimization problem with equality constraints in accordance with an embodiment of the present invention. Generally, we seek a solution in a single box specified by the user. However, any number of boxes can by specified.

The boxes can be disjoint or overlap. However, if they overlap, a minimum at a point that is common to more than one box is separately found as a solution in each box containing it. In this case, computing effort is wasted. If the user does not specify an initial box or boxes, we use a default box. The process described below finds the global minimum in the set of points formed by the set of boxes. We assume these initial boxes are placed in a list $L_1$ of boxes to be processed.

Suppose the user of the process knows a point x_bar that is guaranteed to be feasible. If so, we use this point to compute an initial upper bound f_bar on the global minimum f*. If x_bar cannot be represented exactly on the computer, the system forms a representable interval vector X containing x_bar. We evaluate $f(X)$ and obtain [lower bound $f(X)$, upper bound $f(X)$]. Even if rounding and/or dependence are such that X cannot be numerically proven to be certainly feasible, we rely upon the user and assume that X contains a feasible point. Therefore, we set f_bar equal to the upper bound of $f(X)$.

Also the user may know an upper bound f_bar on f* even though he may not know where (or even if) f takes on such a value in the feasible region defined by the inequality constraints. If so, we set f_bar equal to this known bound. If the known bound is not representable on the computer, the system rounds the value up to a larger value that is representable.

If no feasible point is known and no upper bound on f* is known, we set f_bar=+∞. We assume the user has specified a box size tolerance $\epsilon_X$ and a function width tolerance $\epsilon_F$.

The system specifies $w_R$ and $w_I$. In doing so, the system sets $w_R$=0. If a single box $X^{(0)}$ is given, the system sets $w_I = w(X^{(0)})$, wherein $w(X^{(0)})$ is the width of the box $X^{(0)}$. If more than one box is given, the system sets $w^I$ equal to the width of the largest one.

Thus, to initialize our process, the system specifies $\epsilon_X$, $\epsilon_F$, $w_R$, $w_I$, and the initial box(es). In addition, the system specifies a bound f_bar if one is known.

The steps of the process are to be performed in the order given except as indicated by branching.

For each initial box X in the list $L_1$, the system evaluates $f(X)$ (step 701).

Next, if f_bar<∞, the system deletes any box X from $L_1$ for which the lower bound of $f(X)$>f_bar. This can be done while applying term consistency (step 702).

If $L_1$ is empty, the system goes to step 745. Otherwise, the system finds the box X in $L_1$ for which the lower bound of $f(X)$ is smallest. For later reference, the system calls this box $X^{(1)}$. This box is processed next. The system deletes $X^{(1)}$ from $L_1$ (step 703).

Next, if $w[f(X)] > \epsilon_F$, the system goes to step 706 (step 704).

Then, if $w(X) \leq \epsilon_X$, the system puts X in list $L_2$ and goes to step 703 (step 705).

Next, the system applies term consistency to the constraint equations $q_{1i}(x)=0$ (i=1, ..., r) for i=1, ..., r. If it is proved that there is no point in X that satisfies any one of the constraints, the system goes to step 703 (step 706).

If $sup(f(X)) \leq f\_bar$, the system goes to step 711 (step 707).

Next, if $w[f(X)] \leq \epsilon_F$ and $w(X) \leq \epsilon_X$, the system puts X in list $L_2$ and goes to step 703 (step 708).

Then, if $X^{(1)}$ (as defined in step 703) has been sufficiently reduced, the system puts X in the list $L_1$ and goes to Step 703 (step 709). We say that a box X is sufficiently reduced if any component of X is reduced by an amount that is at least a fraction (say 0.25) of the width of the widest component of X.

If $f[m(X)] \geq f\_bar$, the system goes to step 713 (step 710).

For later reference, the system calls the current box $X^{(2)}$. The system then uses a linearization test to decide whether to linearize and "solve" the inequality $f(x) \leq f\_bar$. Let $w_I$ denote the width of the smallest box for which $M^I$ is irregular. Let $w_R$ denote the width of the largest box for which $M^I$ is regular. Initially, set $w_I = w(X^{(0)})$ and $w_R=0$. We use $w_I$ and $w_R$ to decide whether to generate and attempt to solve $g(x)+J(x,X)(y-x)=0$ for a given box X. We do so if $w(X) \leq (w_I+w_R)/2$. (see Chapter 12 of Global Optimization Using Interval Analysis by Eldon R. Hansen, Marcel Dekker, Inc., 1992) (step 711).

If $sup(f(X)) \leq f\_bar$, the system goes to step 714 (step 712).

Next, the system applies term consistency to the relation $f(x) \leq f\_bar$. If the result is empty, the system goes to step 703 (step 713).

If $w[f(X)] \leq \epsilon_F$ and $w(X) \leq \epsilon_X$, the system puts X in list $L_2$ and goes to step 703 (step 714).

If $X^{(1)}$ (as defined in 703) has been sufficiently reduced, the system puts X in $L_1$ and goes to step 703 (step 715).

Next, the system applies box consistency to the constraint equations $q_i(x)=0$ (i=1, ..., r) for i=1, ..., r. If it is proved that there is no point in X that satisfies any one of the constraints, the system goes go to step 703 (step 716).

If $inf(f[m(X)]) \geq f\_bar$, the system goes to step 722 (step 717).

If the current box is the same box $X^{(2)}$ defined in step 711, the system goes to step 720 (step 718).

Next, the system again uses the procedure in step 711 to try to reduce the upper bound f_bar (step 719).

If $sup(f(X)) \leq f\_bar$, the system goes to step 722 (step 720).

Next, the system applies box consistency to the relation $f(x) \leq f\_bar$. If the result is empty, the system goes to step 703 (step 721).

If $w[f(X)] \leq \epsilon_F$ and $w(X) \leq \epsilon_X$, the system puts X in list $L_2$ and goes to step 703 (step 722).

Next, if $X^{(1)}$ (as defined in step 703) has been sufficiently reduced, the system puts X in the list $L_1$ and goes to step 703 (step 723).

If $inf(f[m(X)]) \geq f\_bar$, the system goes to step 713 (step 724).

Next, the system denotes the current box by $X^{(3)}$, and applies a linear method involving a Taylor expansion to try to reduce $X^{(3)}$ using $f(X) \leq f\_bar$. If the result is empty, the system goes to step 703 (step 725).

Then, if $w[f(X)] \leq \epsilon_F$ and $w(X) \leq \epsilon_X$, the system puts X in list $L_2$ and goes to step 703 (step 726).

If $X^{(3)}$ as defined in step 726 was not sufficiently reduced in the single step 725, the system goes to step 730.

Next, the system applies a quadratic method in which f is expanded through quadratic terms to try to reduce the current box using $f(X) \leq f\_bar$. If the result is empty, the system goes to step 703 (step 728).

If $w[f(X)] \leq \epsilon_F$ and $w(X) \leq \epsilon_X$, the system puts X in list $L_2$ and goes to step 703 (step 729).

If $X^{(1)}$ (as defined in step 703) has been sufficiently reduced, the system puts X in $L_1$ and goes to step 703 (step 730).

Next, the system uses a criterion $w(X)>(w_I+w_R)/2$ to decide whether to (try to) solve the constraints in linearized form. If not, the system goes to step 744 (step 731). Note that, we denotes the width of the smallest box for which $M^I=BJ(x,X)$ is irregular. If $M^I$ is regular for a given box, $w_R$ denotes the width of the largest box for which $M^I$ is regular (step 731).

The system then replaces n-r of the variables by their interval bounds, and renames the remaining variables as $x_1 1, \ldots x_r$. Then the system linearizes the constraint functions as functions of the variables now called $x_1, \ldots x_r$. The system also computes an approximate inverse B of the approximate center of the Jacobian $J(x,X)$ (step 732).

Next, the system preconditions the linearized system. If the preconditioned coefficient matrix is regular, the system finds the hull of the linearized system. If the result is empty, the system goes to step 703 (step 733).

If $w[f/(X)] \leq \epsilon_F$ and $w(X) \leq \epsilon_X$, the system puts X in list $L_2$ and goes to step 703 (step 734).

Next, the system analytically multiplies the nonlinear system of constraint equations by the matrix B. It does so without replacing any variables by their interval bounds so that appropriate combinations and cancellations can be made. After the analytic multiplication is complete, the system replaces the fixed variables (as chosen in step 732) by their interval bounds. The system also applies term consistency to solve the i-th nonlinear equation of the preconditioned nonlinear system for the i-th variable (as renamed in step 732) for $i=1, \ldots, r$. If the result is empty, the system goes to step 703 (step 735).

If $w[f(X)] \leq \epsilon_F$ and $w(X) \leq \epsilon_X$, the system puts X in list $L_2$ and goes to step 703 (step 736).

Next, the system applies term consistency to solve the i-th nonlinear equation of the preconditioned nonlinear system for the i-th (renamed) variable for $i=1, \ldots, r$. If the result is empty, the system goes to step 703. If the existence of a feasible point is proved (see Section 10.12), the system uses the result to update $f\_bar$ (step 737).

If $w[f(X)] \leq \epsilon_F$ and $w(X) \leq \epsilon_X$, the system puts X in list $L_2$ and goes to step 703 (step 738).

Next, the system applies box consistency to solve the i-th nonlinear equation of the preconditioned nonlinear system for the i-th (renamed) variable for $i=1, \ldots, r$. If the result is empty, the system goes to step 703 (step 739).

If $w[f(X)] \leq \epsilon_F$ and $w(X) \leq \epsilon_X$, the system puts X in list $L_2$ and goes to step 703 (step 740).

Next, the system uses the criterion $w(X)>(w_I+w_R)/2$ to decide whether to (try to) solve the John conditions using a Newton method. If not, the system goes to step 744 (step 741).

The system then applies one step of the interval Newton method for solving the John conditions. If the result is empty, the system goes to step 703. If the existence of a solution of the John conditions is proved, the system updates $f\_bar$ (step 742).

If the box $X^{(1)}$ (as defined in step 703) has been sufficiently reduced, the system puts X in $L_1$ and goes to step 703 (step 743).

Any previous step that used term consistency, a Newton step, or a Gauss-Seidel step might have generated gaps in the interval components of X. The system merges any such gaps when possible, and splits the box. This may involve deleting some gaps. The system places the subboxes (generated by splitting) in the list $L_1$ and goes to step 703 (step 744).

If the list $L_2$ is empty, the system indicates that there is no feasible point in $X^{(0)}$. The system then goes to step 750 (step 745).

If $f\_bar<+\infty$ and there is only one box in $L_2$, the system goes to step 750 (step 746).

For each box X in $L_2$, if $\sup(f(m(X)))<f\_bar$, the system tries to prove existence of a feasible point. The system uses the results to update $f\_bar$ (step 747).

Next, the system deletes any box X from $L_2$ for which the lower bound of $f(X)>f\_bar$ (step 748).

The system denotes the remaining boxes by $X^{(1)}, \ldots, X^{(s)}$ where s is the number of boxes remaining in $L_2$. The system then determines $$\underline{F} = \min_{1 \leq i \leq s} \underline{f}(X^{(1)}) \text{ and } \overline{F} = \max_{1 \leq i \leq s} \overline{f}(X^{(1)}) \text{ (step 749).}$$

Finally, the system terminates (step 750).

If, at termination, the list $L_2$ is empty, then all of the initial box $X^{(0)}$ has been eliminated. This provides proof that the initial box $X^{(0)}$ does not contain a feasible point.

Assume that at least one box remains in the list $L_2$. What we have proved in this case depends on the final value of $f\_bar$. If $f\_bar<+\infty$, then we know that a feasible point exists in the initial box $X^{(0)}$. If $f\_bar = \infty$, there may or may not be a feasible point in $X^{(0)}$.

Consider the case $f\_bar<\infty$. No matter how poor the bound $f\_bar$ on $f^*$, we know that a global solution exists in $X^{(0)}$; and it is in one of the remaining boxes. Also, we know that, $$\underline{E} \leq f^* \leq \overline{F}.$$

If only one box X remains, then it must contain the global solution. In this case, $$\underline{f}(X) \leq f^* \leq \min\{\overline{f}(X), f\_bar\} \text{ and } \overline{f}(X)-\underline{f}(X) \leq \epsilon_F.$$

Therefore, $f(x)-f^* \leq \epsilon_F$ for every point x in the box. Also, $$x^*_i, -\underline{X_i} \leq \epsilon_X \overline{X}_1-x^*_1 \leq \epsilon_X (i=1, \ldots n).$$

If more than one box remains, it is possible that one contains a local solution at which $f$ is less than our upper bound $f\_bar$. Also, there might be more than one global solution occurring in separate boxes. We know only that $$\underline{E} \leq f^* \leq \min\{\overline{F}, f\_bar\}$$

and that the global minimum point(s) are in the remaining boxes.

If the final value of $f\_bar$ is $\infty$ $X^{(0)}$ is not entirely deleted, then $X^{(0)}$ may or may not contain a feasible point. We do not know. It is highly probable that a solution exists since, otherwise, we expect all of $X^{(0)}$ to be deleted. However, we do know that if a feasible point does exist in $X^{(0)}$, then $$\underline{E} \leq f^* \leq \overline{F}$$

and $x^*$ is somewhere in the remaining box(es). All local solutions in the initial box are contained in the final solution box(es).

It is possible that every point in the initial box $X^{(0)}$ is infeasible. However, our process can delete all of $X^{(0)}$ (and thus prove there is no solution) only if every point in $X^{(0)}$ is proved to be feasible (i.e., is certainly infeasible). Even if every point in $X^{(0)}$ is certainly infeasible, our process may still not delete all of $X^{(0)}$. The probability of it doing so in this case is greater when the box size tolerance $\epsilon_X$ is smaller.

Thus, we can prove there is no feasible point in $X^{(0)}$, but we do not guarantee doing so when this is, in fact, the case.

Regardless of what procedure is used to delete a part of $X^{(0)}$, we know that the deleted part cannot contain a solution.

The foregoing descriptions of embodiments of the present invention have been presented only for purposes of illustration and description. They are not intended to be exhaustive or to limit the present invention to the forms disclosed.

For example, global optimization problems can contain both inequality and equality constraints. In this case, the present invention can be combined with a system that solves an interval inequality constrained global optimization problem to form an overall system.

Accordingly, many modifications and variations will be apparent to practitioners skilled in the art. Additionally, the above disclosure is not intended to limit the present invention. The scope of the present invention is defined by the appended claims.

What is claimed is:

1. A computer system for solving an interval global optimization problem specified by a function $f$ and a set of equality constraints, the computer system comprising:
    a processing unit;
    a memory;
    an interval arithmetic unit within the processing unit, wherein the interval arithmetic unit is configured to receive floating-point numbers representing a first endpoint and a second endpoint for a first interval, and floating-point numbers representing a first endpoint and a second endpoint for a second interval, and is configured to perform arithmetic operations to produce a first endpoint and a second endpoint representing a resulting interval;
    wherein computational code within the memory is configured to perform an interval global optimization process to compute guaranteed bounds on a globally minimum value of the function $f(x)$ subject to the set of equality constraints;
    wherein the interval global optimization process is configured to,
        apply term consistency to the set of equality constraints over a subbox X, and to
        exclude portions of the subbox X that can be shown by using term consistency to violate any of the equality constraints, wherein using term consistency involves intersecting the first interval with an inverse of a function derived from the first interval.

2. The computer-system of claim 1,
    wherein the interval arithmetic unit includes a first input, wherein the first input includes a first floating point number representing a lower bound of the first input and a second floating point number representing an upper bound of the first input; and
    wherein the interval arithmetic unit includes a second input, wherein the second input includes a third floating point number representing a lower bound of the second input and a fourth floating point number representing an upper bound of the second input.

3. The computer-system of claim 1, wherein the optimizer is configured to:
    precondition the set of equality constraints through multiplication by an approximate inverse matrix B to produce a set of preconditioned equality constraints;
    apply term consistency to the set of preconditioned equality constraints over the subbox X; and to
    exclude portions of the subbox X that can be shown to violate any of the preconditioned equality constraints.

4. The computer-system of claim 1, wherein the optimizer is configured to:
    keep track of a least upper bound $f\_bar$ of the function $f(x)$;
    unconditionally remove from consideration any subbox for which $\inf(f(x)) > f\_bar$;
    apply term consistency to the inequality $f(x) \leq f\_bar$ over the subbox X; and to
    exclude portions of the subbox X that violate the inequality.

5. The computer-system of claim 1, wherein the optimizer is configured to:
    apply box consistency to the set of equality constraints $q_i(x)=0$ ($i=1, \ldots, r$) over the subbox X; and to
    exclude portions of the subbox X that violate the set of equality constraints.

6. The computer-system of claim 1, wherein the optimizer is configured to:
    evaluate a first termination condition;
    wherein the first termination condition is TRUE if a function of the width of the subbox X is less than a pre-specified value, $\epsilon_X$, and the absolute value of the function, $f$, over the subbox X is less than a pre-specified value, $\epsilon_F$; and to
    terminate further splitting of the subbox X if the first termination condition is TRUE 7. The computer-system of claim 1, wherein the optimizer is configured to perform an interval Newton step on the John conditions.

* * * * *

UNITED STATES PATENT AND TRADEMARK OFFICE
CERTIFICATE OF CORRECTION

PATENT NO. : 7,099,851 B2 Page 1 of 1
APPLICATION NO. : 10/017573
DATED : August 29, 2006
INVENTOR(S) : G. William Walster et al.

It is certified that error appears in the above-identified patent and that said Letters Patent is hereby corrected as shown below:

On Title Page, Item (57)
In abstract (at line 52, please delte the equation, "$q_1(x)=0$" and replace with the equation --$q_i(x)=0$--.

Signed and Sealed this

Fourteenth Day of November, 2006

JON W. DUDAS
*Director of the United States Patent and Trademark Office*